May 13, 1969   S. M. BLOOM ET AL   3,443,939
DIFFERENTIAL MOBILITY OF COLOR MOIETY IN COLOR TRANSFER
Filed July 24, 1967
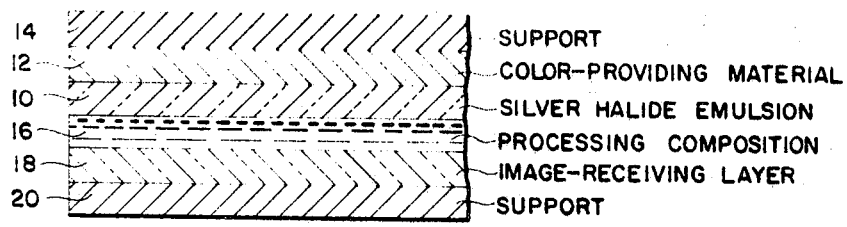
14 — SUPPORT
12 — COLOR-PROVIDING MATERIAL
10 — SILVER HALIDE EMULSION
16 — PROCESSING COMPOSITION
18 — IMAGE-RECEIVING LAYER
20 — SUPPORT
INVENTOR.
Stanley M. Bloom
and
Robert R. Stephens
BY
Brown and Mikulka
and
Alvin Isaacs
ATTORNEYS

United States Patent Office 3,443,939
Patented May 13, 1969

3,443,939
DIFFERENTIAL MOBILITY OF COLOR MOIETY IN COLOR TRANSFER
Stanley M. Bloom, Waban, and Robert K. Stephens, Burlington, Mass., assignors to Polaroid Corporation, Cambridge, Mass., a corporation of Delaware
Filed July 24, 1967, Ser. No. 655,436
Int. Cl. G03c 7/00, 5/54
U.S. Cl. 96—3
13 Claims

ABSTRACT OF THE DISCLOSURE

This invention relates to color photography wherein novel systems are provided for obtaining, as a function of development of an exposed photosensitive element, a differential in diffusibility or mobility of a color-providing material whereby an imagewise distribution of more mobile color-providing material may be transferred by imbibition to a superposed sheet material to provide thereon a negative color transfer image.

Background of the invention

The copending application of Stanley M. Bloom, Ser. No. 655,338 filed concurrently describes and claims a novel class of compounds which may be defined as being relatively immobile and non-diffusible silver halide developing agents containing a color-providing moiety and which are capable of providing, upon development of an exposed silver halide emulsion, an oxidation product which can auto-react intramolecularly to form a heterocyclic ring and as a function of such reaction to split off a mobile and diffusible color-providing material.

These compounds may be represented by the following formula:

(A)
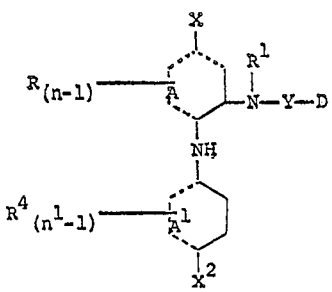

wherein:

A and $A^1$ each represent the atoms necessary to complete a benzene or naphthalene ring, which ring may be further substituted;

D is a color-providing moiety, e.g., a complete dye such as a monoazo, disazo or anthraquinone dye which may, if desired, be metallized in known manner;

Y is any substituent which completes or forms an amide with, and reduces the basic character of the amino group in the 3-position, such as the residue of an acid, linking the color-providing moiety D to the 3-nitrogen atom, and which is capable of being eliminated during the ring formation to be described with more particularity hereinafter, e.g.

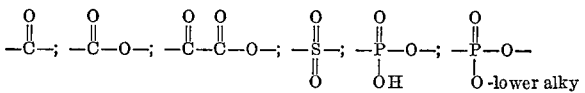

etc.;

R and $R^4$ each represent an "anchoring" or immobilizing substituent rendering the compound non-diffusible, e.g., higher alkyl such as decyl, dodecyl, stearyl, oleyl, etc. linked directly to the aromatic nucleus or linked indirectly thereto through an appropriate linking group, e.g., —CONH—,

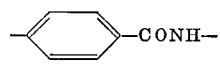

etc., an aromatic ring, e.g., of the benzene or naphthalene series, or a heterocyclic ring, which rings may be either bonded to a single carbon atom of the aromatic nucleus or fused thereto, i.e., bonded to a pair of adjacent carbon atoms; or R and/or $R^4$ may be a plurality of short chain radicals which together provide the anchoring moiety, each of said short chain radicals being linked directly or indirectly to a different carbon atom of the aromatic nucleus formed by the A and/or $A^1$ moieties;

X is hydrogen, hydroxy, amino, e.g., a primary, secondary or tertiary amino substituent of the formula:

wherein each $R^3$ may be hydrogen, a hydrocarbon radical, e.g., alkyl, such as methyl, ethyl, butyl, dodecyl, etc., aryl such as phenyl or naphthyl attached through a carbon atom thereof to the nitrogen atom, a cyclic alkyl such as cyclopentyl or cyclohexyl, i.e., where both $R^3$'s are alkylene comprising together with the nitrogen atom a heterocyclic ring, a substituted alkyl, such as hydroxyethyl, methoxyethoxyethyl, polyglycoloxyethyl, carboxymethyl, benzyl, phenylethyl, sulfo-phenylethyl, acetylamino-phenylethyl, succinylamino-phenylethyl, furanemethyl, etc.; or a substituted aryl such as methylphenyl, ethylphenyl, etc., or the anchoring substituent R;

$X^2$ is hydrogen, hydroxy, an amino group such as may be contained by said X moiety, as previously described, or the anchoring substituent $R^4$, provided that one of said X and $X^2$ moieties must be hydroxy or amino;

$R^1$ is hydrogen, an alkyl such as methyl, ethyl, propyl, butyl, hexyl, octyl, dodecyl, cyclohexyl, etc.; or a substituted alkyl such as 2-hydroxyethyl, 3-dihydroxypropyl, carboxymethyl, carboxyethyl, carboxybutyl, carboxydecyl, hydroxyethyl-ether, polyglycoloxyethyl, furanemethyl, benzyl, phenylethyl, carboxyphenylethyl, sulfophenylethyl, acylaminophenylethyl, etc.; and $n$ and $n^1$ each is a positive integer from 1 to 2, provided that when $R^1$ or $R^3$ alone or together comprise one of those heretofore named substituents rendering the compound non-diffusible, either or both of $n$ and $n^1$ may be 1 but when $R^1$ and $R^3$ alone or together do not provide such an anchoring moiety at least one of $n$ and $n^1$ must be 2.

The copending application of Stanley M. Bloom and Howard G. Rogers, Ser. No. 655,440 filed concurrently, describes and claims novel photographic systems for preparing positive dye transfer image with the above-mentioned compounds. According to the procedures described and claimed in this copending application a photosensitive element is provided containing at least one light-sensitive silver halide emulsion and an associated layer containing one of the aforementoned compounds and a silver-precipitating agent. When such a photosensitive element is exposed and then developed with an aqueous alkaline processing composition including a relatively immobile silver halide developing agent and a silver halide solvent, in known manner exposed silver halide is reduced to silver while a soluble silver complex is formed in terms of unexposed and undeveloped areas of the emulsion. This imagewise distribution of soluble silver complex is at least in part transferred into contact with the said compound where, in the presence of the precipitating nuclei, it is reduced and the compound in turn oxidized in an imagewise pattern corresponding to unexposed areas of the emulsion. The oxidation product then ring-closes with elimination of diffusible dye which is then free to transfer, by imbibition, to a superposed image-receiving layer to form a positive image thereon.

The present invention is directed to an entirely different approach which utilizes compounds of the foregoing description to obtain negative transfer images.

Summary of the invention

According to the present invention negative color transfer images are obtained by developing an exposed light-sensitive silver halide emulsion in the presence of one of the aforementioned compounds; and oxidizing this compound in terms of exposed areas of the emulsion, as a function of development to form an oxidation product which in turn ring-closes in the previously described manner with elimination of the diffusible color-providing moiety which is then free to transfer by imbibition to a superposed image-receiving layer to form a negative color transfer image thereon.

The desired imagewise oxidation of the color-providing material in terms of exposed areas of the emulsion may be accomplished by a redox reaction with oxidized developing agent obtained by development of the exposed silver halide emulsion with a processing composition containing a silver halide developing agent, the oxidation product of which is mobile and reducible. In such a system exposed silver halide is reduced to silver and as a function of development the developing agent is in turn oxidized to provide an imagewise distribution of oxidized developing agent in terms of exposed areas of the silver halide emulsion. This imagewise distribution of oxidized developing agent then contacts the color-providing material where a redox reaction occurs in which the developing agent is reduced and the color-providing material in turn oxidized in an imagewise pattern corresponding to exposed areas of the emulsion to effect ring-closure and subsequent release of the mobile color-providing moiety in terms of exposed areas of the emulsion.

In the preparation of monochromatic color transfer images by this procedure, the color-providing material may be present initially in the photosensitive element, e.g., in the layer containing the silver halide emulsion or in a separate layer associated therewith, or it may be present initially in the processing composition. Multicolor transfer images may also be obtained by providing a photosensitive element containing two or more light-sensitive silver halide emulsion layers each having associated therewith in the same or in a different layer one or more of the above-mentioned color-providing materials.

Negative color transfer images may also be obtained by providing a photosensitive element containing one or more silver halide emulsion layers each of which has associated therewith in the same or in a different layer one or more of the aforementioned color-providing materials and developing such an exposed photosensitive element with an aqueous alkaline processing composition containing no silver halide developing agent. In this instance the color-providing material, which it will be noted is itself a silver halide developing agent, is the only silver halide developing agent employed. In this latter system the color-providing material—developing agent reduces exposed areas of the silver halide emulsion layer with which it is associated and is in turn oxidized as a function of this development with subsequent ring-closure and elimination of the mobile and diffusible color-providing moiety.

While the process of this invention may be employed in the preparation of negative color images in general it may be particularly useful in the preparation of color radiographs.

Brief description of the drawing

The figure is a partially schematic, partially enlarged fragmentary sectional view of a film unit during processing thereof to prepare a negative color transfer image in accordance with this invention.

Description of preferred embodiment

The preferred class of compounds of Formula A for use in the practice of this invention may be represented by the formula:

(B)
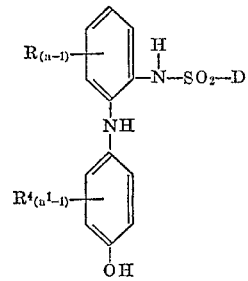

wherein the anchoring moiety R or $R^4$ comprises a long chain amide, e.g., of at least 13 carbon atoms; and nuclear substituted derivatives thereof, e.g., where any of the nuclear carbon atoms not specifically substituted may contain a carboxy, alkyl, alkoxy, amino, chloro, hydroxy or amide substitutent.

A primary object of this invention, therefore, is to provide novel processes and products for preparing negative color images by diffusion transfer.

Another object is to provide novel systems for obtaining as a function of development of an exposed photosensitive element a differential in diffusibility or mobility of a color-providing material, whereby an image-wise distribution of more mobile color-providing material may be transferred by imbibition to a superposed sheet material to provide a negative color transfer image thereon.

A further object is to provide novel systems for obtaining a negative color transfer image utilizing compounds which upon development of an associated exposed silver halide emulsion undergo a chemical reaction to release for transfer an imagewise distribution, in terms of exposed areas of the emulsion, of mobile and diffusible color-providing material.

Other objects of the invention will in part be obvious and will in part appear hereinafter.

The invention accordingly comprises the several steps and the relation and order of one or more of such steps with respect to each of the others, and the product possessing the features, properties and the relation of elements, which are exemplified in the following detailed disclosure, and the scope of the application of which will be indicated in the claims.

For a fuller understanding of the nature and objects of the invention, reference should be had to the following detailed description taken in connection with the accompanying drawing.

According to the present invention the aforementioned objectives may be accomplished by providing a photosensitive element including at least one light-sensitive silver halide emulsion having associated therewith in the same or in a different layer a compound of the foregoing description which upon development of the exposed photosensitive element with an aqueous alkaline processing composition containing a silver halide developing agent, the oxidation product of which is reducible by a redox reaction with the said compound; exposing the said photosensitive element; and developing the thus exposed element by spreading the aforementioned processing composition between the exposed element and a superposed receiving layer or dyeable stratum, whereby exposed areas of the silver halide emulsion are developed and, as a function of development, the developing agent is in turn oxidized to provide an oxidation product which is capable of migrating to the said compound where the redox reaction occurs to oxidize the compound, thereby effecting ring-closure and subsequent release of a mobile and diffusible color-providing material in terms of exposed areas of the emulsion, which color-providing material is transferred by imbibition to the superposed stratum to form thereon the desired negative color transfer image. From the foregoing it will be appreciated that color image formation is predicated upon a differential in diffusibility or mobility of a color-providing material obtained as a result of a redox reaction with oxidized developing agent resulting from development of exposed areas of a silver halide emulsion.

This aspect of the invention will be more readily understood by reference to the accompanying drawing which shows a photosensitive element which has previously been exposed being procesed in accordance with this invention to provide a negative color transfer image. The photosensitive element is shown to comprise a light-sensitive silver halide emulsion layer 10 and a layer 12 of the color-providing material of Formula A carried on a suitable transparent or opaque support 14. Emulsion layer 10 comprises any of the conventional silver halide emulsions, e.g., silver chloride, silver bromide, silver bromoiodide, silver chlorobromide or silver chlorobromoiodide.

The emulsion layer may also contain the various additives heretofore employed in such layers, e.g., sensitizers, antifoggants, hardeners, plasticizers, coating aids, speed-increasing materials, ultraviolet absorbers, etc. The dispersing agent or substrate for the silver halide may be gelatin or any other colloidal material heretofore employed for such purposes.

As examples of typical materials which may be employed for the support 14, mention may be made of films of cellulose nitrate, cellulose acetate, polyvinyl acetal, polystyrene, polyethylene terephthalate, polyethylene, polypropylene, polycarbonate, etc., paper, glass and other such materials.

Layer 12 may comprise the color-providing material in a suitable, permeable carrier or matrix, e.g., gelatin, cellulose acetate hydrogen phthalate, etc.

The processing composition 16 for developing the exposed element while in superposition with an image-receiving layer or dyeable stratum 18 on a suitable support 20 comprises at least an aqueous alkaline solution of a silver halide developing agent.

The alkaline material may, for example, be sodium hydroxide, potassium hydroxide or any of the other alkaline materials heretofore employed in such compositions.

The silver halide developing agent may be any of the known developing agents capable of providing, upon development, an oxidation product which: (1) is reducible, at least by the aforementioned redox reaction; and (2) is of sufficient mobility so as to be capable of migrating to layer 12. Such developing agents, which are per se well known in the art and hence comprise no part of this invention, will be readily suggested to those skilled in the art. By way of illustration, mention may be made of dihydroxybenzene developers such as the hydroquinones, aminophenol developers such as metol, diaminobenzene developers such as 2-amino-5-diethylamino-toluene, etc.

The processing composition may also include additional reagents performing specific desired functions, e.g., viscous film-forming reagents such as hydroxy ethyl cellulose, sodium carboxymethyl cellulose etc., it being understood that any of the named ingredients may be present initially in the film unit, in which case the processing composition containing the developer, alkaline material, etc. is formed by contacting the film unit with the aqueous medium therefor. In any event, the processing composition may, if desired, be confined in a frangible container of "pod" such as described, for example, in U.S. Patents Nos. 2,543,181 and 2,634,886 issued to Edwin H. Land.

While for purposes of illustrating the invention the color-providing material has been shown in the drawing as being in a separate layer in the photosensitive element, it may, if desired, be present in the layer containing the silver halide emulsion.

While, for purposes of illustration, the photo-sensitive element is shown in the drawing to contain a single silver halide emulsion layer and associated layer of color-providing material, a plurality of such emulsion layers may be provided, each having associated therewith in the same or in a different layer, one or more of the aforementioned color-providing materials having different spectral absorption characteristics, to provide a photosensitive element useful in the preparation of multicolor negative transfer images.

Where the color-providing material is present in a different layer, a spacer layer of gelatin or other suitable material permeable to the processing fluid, may be positioned between the respective layers. The use of a spacer layer is described in one of the illustrative examples set forth hereinafter.

Other changes in the structure of the film unit shown in the drawing will be readily apparent in the light of this disclosure and it is therefore to be expressly understood that the drawing is for purposes of illustration only.

As was mentioned previously, the color-providing material may be present initially in the processing composition in lieu of having it contained in the photo-sensitive element, e.g., in layer 12 of the drawing.

In such a system, oxidized developing agent contacts the color-providing material in the processing composition and the redox reaction and subsequent release for transfer of color-providing moiety, occurs therein. The unoxidized and immobile color-providing material is retained in the processing composition which, in known manner, adheres preferentially to the photosensitive element and is removed therewith upon separation of the respective elements following processing, so that a negative color transfer image is formed in terms of the imagewise distribution of mobile color-providing moiety corresponding to exposed areas of the emulsion. Various stripping layers known in the art may be employed to obtain clean separation of the image-receiving element containing the transfer image, if found desirable or expedient to do so.

In another aspect of the invention, negative color image formation may be obtained by employing the color-providing material in the photosensitive element as the only silver halide developing agent. In such a system, the processing composition need only comprise an aqueous alkaline medium. In this regard it will be noted that since at least one of X and $X^2$ is hydroxy or amino, the color-providing material is also a discriminating silver halide developing agent. Although substantially immobile, i.e., of very low mobility in the processing fluid, since this color-providing material—developing agent is of close proximity to the silver halide, upon a suitable imbibition time, e.g., two minutes, this material develops exposed silver and is in turn oxidized to release for transfer the color-providing moiety. It will be noted, however, that because of its relative immobility, longer imbibition times are needed than in the previously disclosed embodiments of the invention.

By way of recapitulation, the present invention contemplates imagewise transfer of color-providing material in terms of exposed areas of the emulsion to form a negative image; whereas the procedures described and claimed in the aforementioned application Ser. No. 655,440 involve imagewise transfer of color-providing material in terms of unexposed areas to form a positive color transfer image. The reaction mechanisms upon which image formation is predicted are also different. The procedures described in the copending application rely upon reduction of soluble silver complex formed as a function of development and require (1) the presence of a silver halide solvent to form the soluble silver complex and (2) silver-precipitating nuclei to render this complex reducible and the color-providing material in turn oxidized, or in lieu of silver-precipitating nuclei, that the color-providing material be a non-discriminating silver halide developer. If either of these two criteria are not present, positive image formation cannot occur. Stated another way, either but not both of these ingredients may be present in the photographic systems contemplated by the present invention to form negative color transfer images. As distinguished from this system for preparing positive transfer images, the present invention relies upon either a redox reaction or oxidation of the color-providing material as a function of development by it of an exposed silver halide emulsion.

In either instance, the color-providing materials employed are those within the scope of the aforementioned formulae.

As examples of compounds within the scope of formulae A and B, which may be employed in the practice of this invention and which are described and claimed in the aforementioned application Ser. No. 655,338, mention may be made of the following:

(1)

(2)

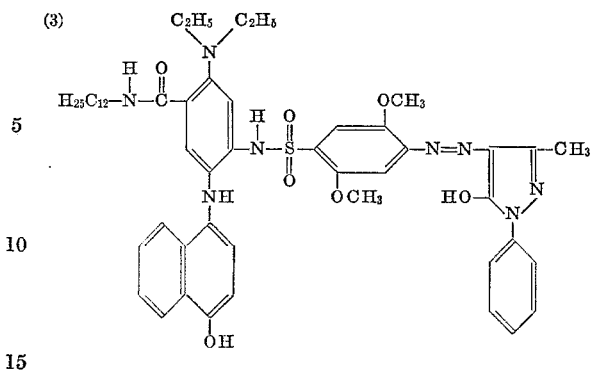

(3)

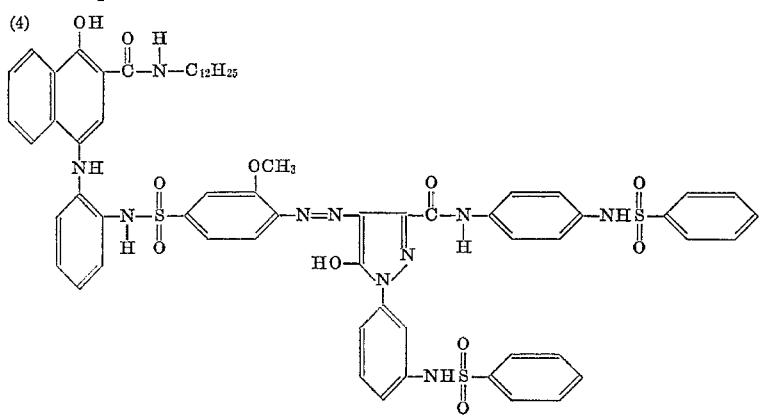

(4)

(5)

(6)

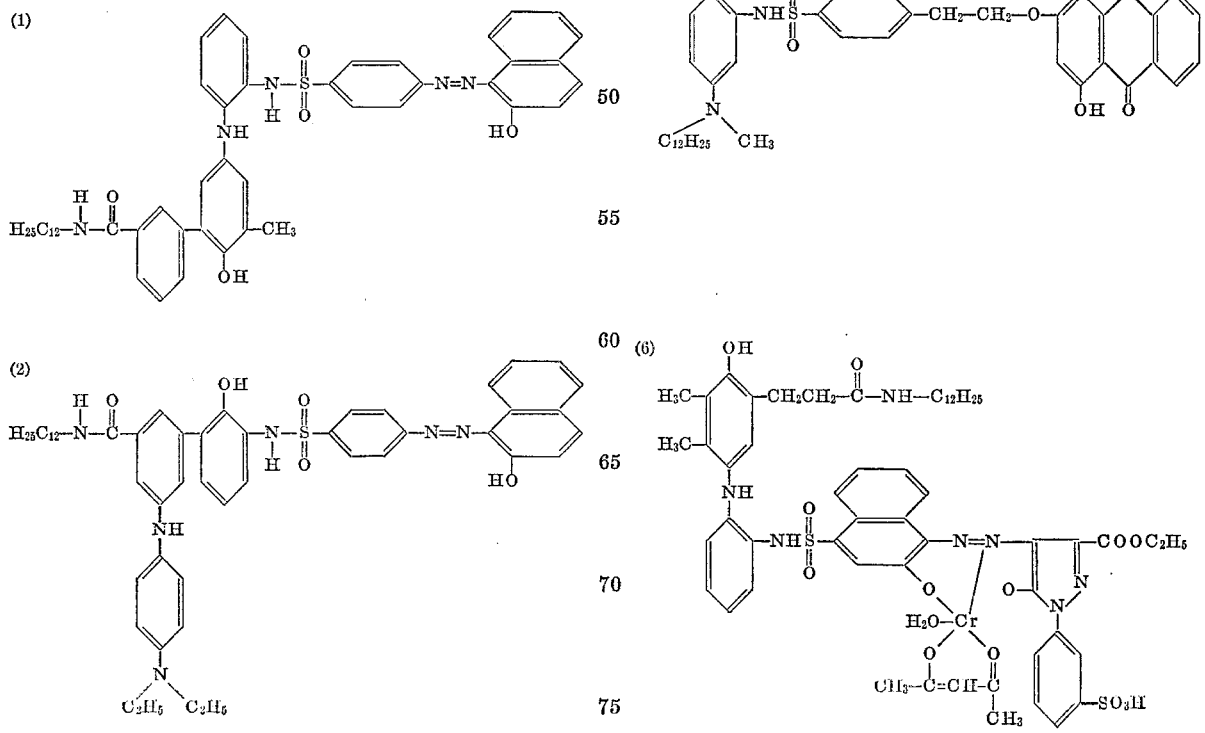

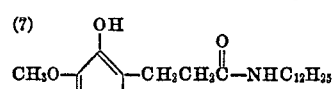
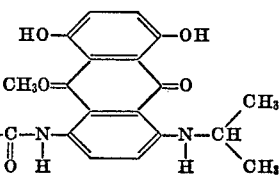
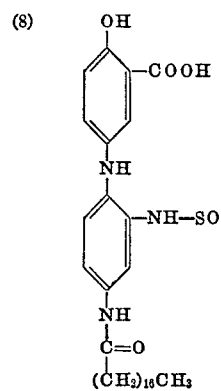
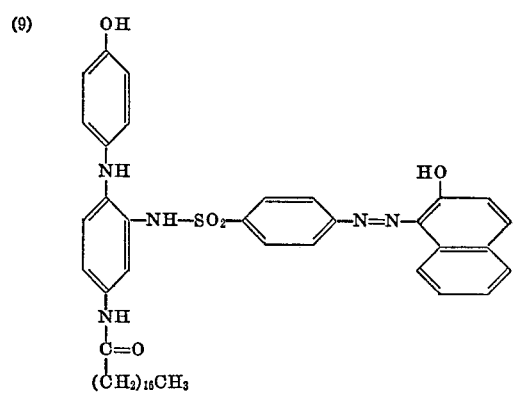
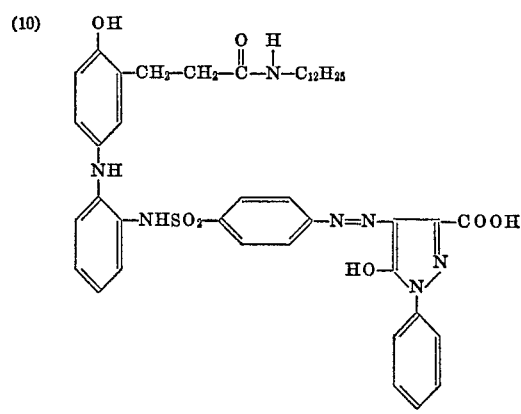
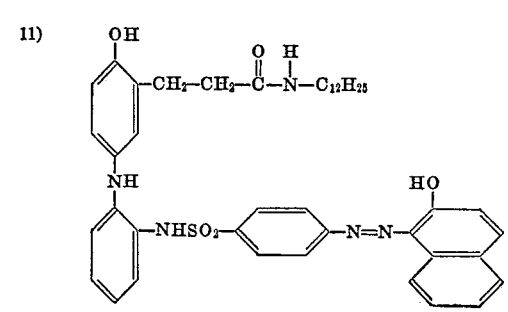
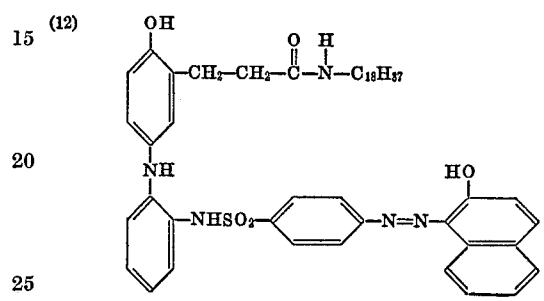
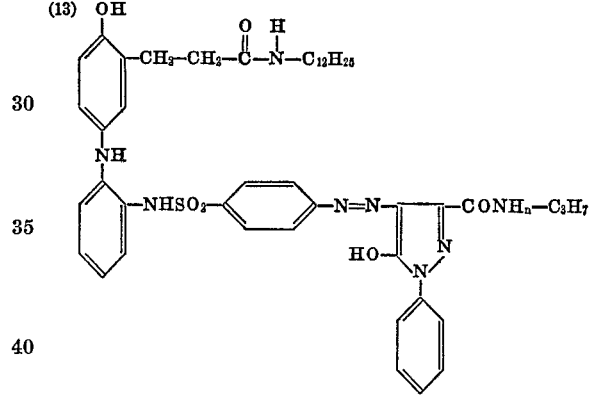
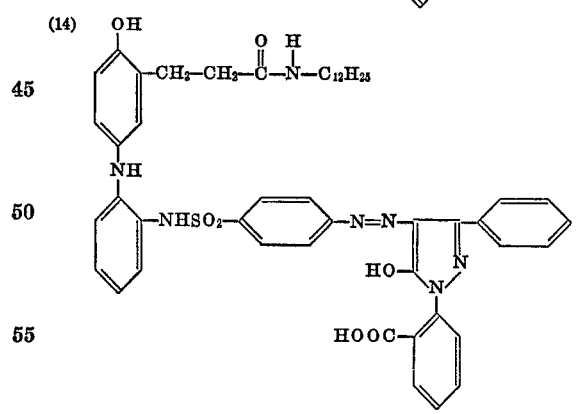
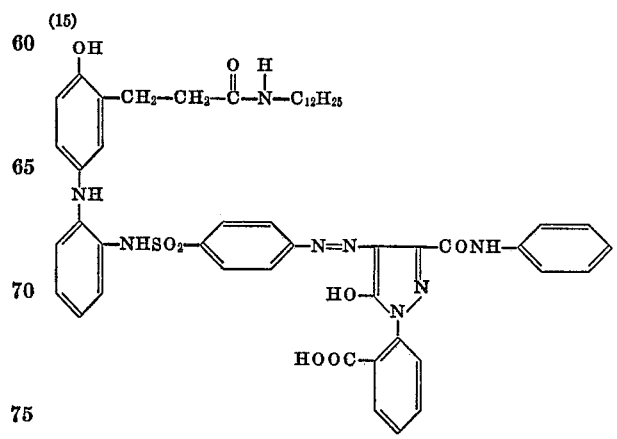

(16)
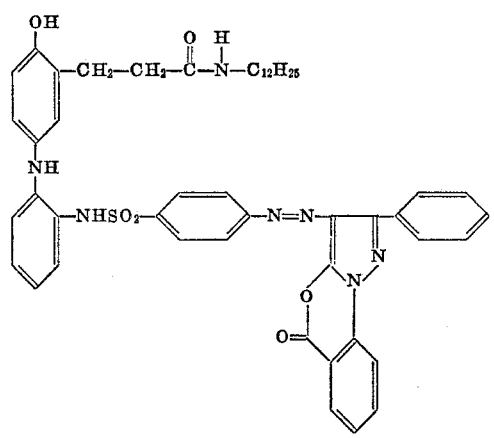
(17)
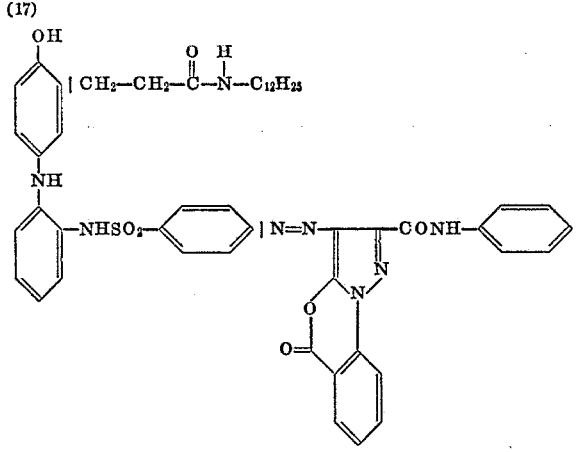
(18)
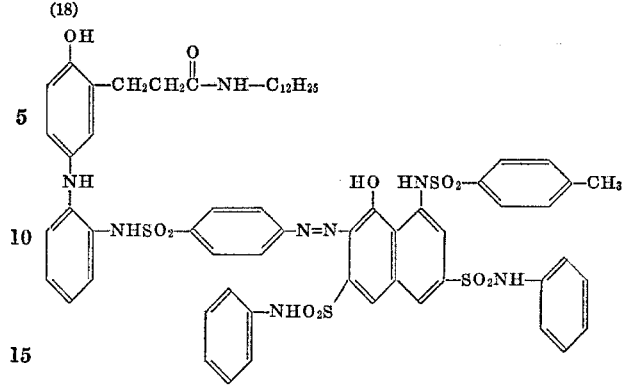
(19)
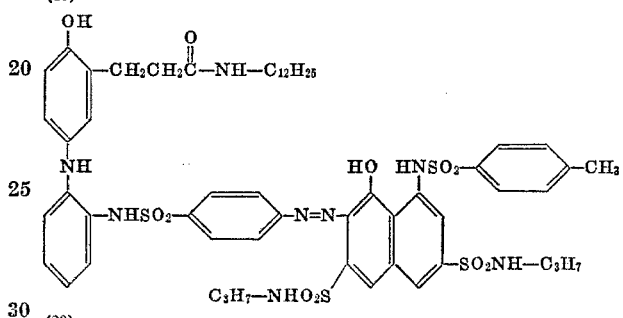
(20)
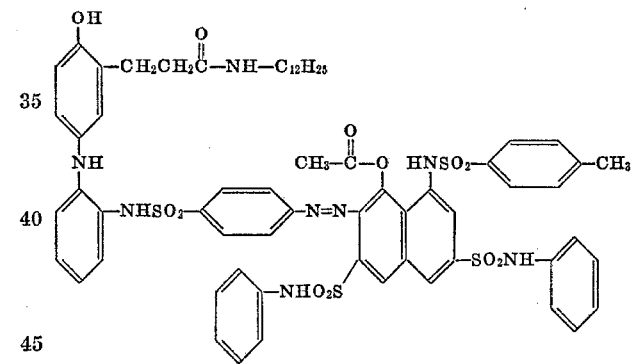
(21)
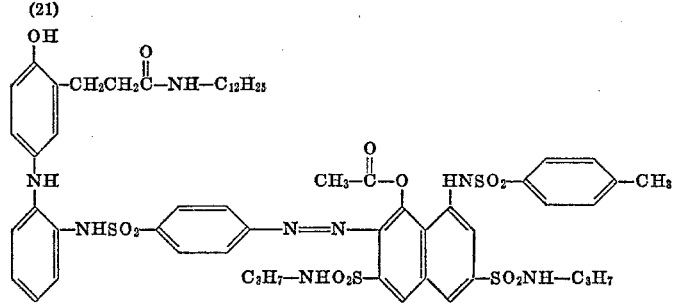
(22)
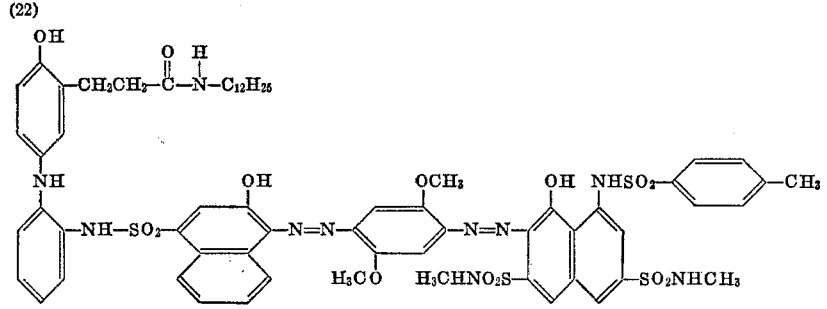

(23) 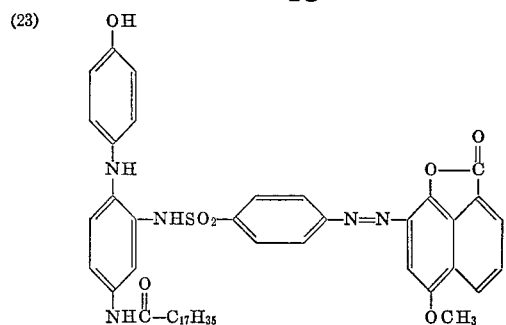

The following examples show by way of illustration and not by way of limitation the preparation of compounds within the scope of Formula A and their use in preparing negative transfer images in accordance with the practice of this invention.

EXAMPLE 1

11.0 g. (0.05 mole) of 6-nitrodehydrocoumarin was dissolved in 100.0 cc. of methyl Cellosolve. 12.0 g. (0.064 mole) of n-dodecylamine was then added. (The reaction was exothermic and a yellow solid separated out.) The mixture was heated until a clear solution was obtained and then cooled to give 14.0 g. of light yellow crystals, M.P. 168–170° C., an amide of the formula:

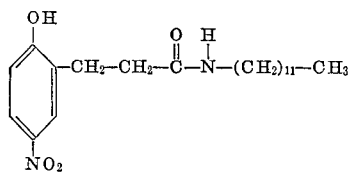

A mixture of 16.5 g. (0.0437 mole) of this amide, prepared in the manner described above, 7.0 g. (0.056 mole) of dimethylsulfate, 9.2 g. (0.066 mole) of potassium carbonate and 250 ml. of xylene was refluxed overnight. The xylene was then removed by steam distillation and an oily product crystallized on standing. Recrystallization of this product from hexane-chloroform yielded 13.3 g. of light tan needles, M.P. 106–108° C. of the formula:

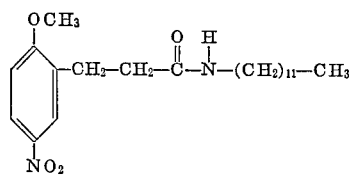

13.3 g. of this latter amide was hydrogenated in 95% ethanol in the presence of a Raney-nickel catalyst. The reaction mixture was filtered and the filtrate evaporated. The resulting solid was recrystallized from hexane-ether to obtain 9 g. of a pure white amine, M.P. 80–82° C. of the formula:

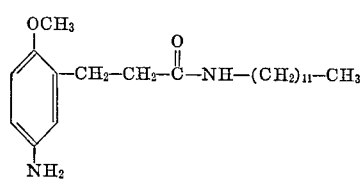

52 g. (0.145 mole) of the amine prepared in the above manner, 21.0 g. (0.145 mole) of 2-fluoronitrobenzene, 7.85 g. (0.195 mole) of magnesium oxide and 100.0 ml. of water were heated in a sealed bomb at 180° C. for 18 hours. The contents of the bomb were then filtered and the solid obtained by filtering was stirred in boiling ethyl acetate and filtered. Cooling of the filtrate yielded 40 g. of a light yellow solid, M.P. 125–126° C., of the formula:

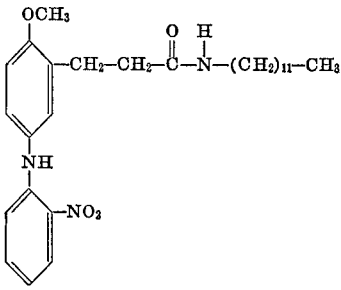

10.0 g. of the last-named product was hydrogenated with 5% Pd/BaSO₄ in ethyl acetate to reduce the nitro group to the corresponding amine. The reaction mixture was filtered and the filtrate was then cooled in Dry Ice. Filtration yielded 9 g. of an off-white solid, M.P. 81–83° C., an amine of the formula:

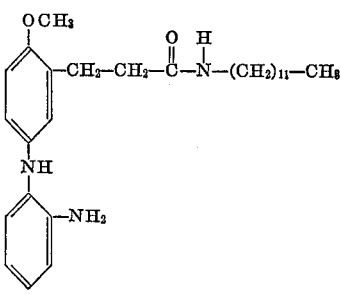

4.54 g. (0.01 mole) of this amine and 3.5 g. (0.1 mole) of the sulfonyl chloride of Orange II, a dye of the formula:

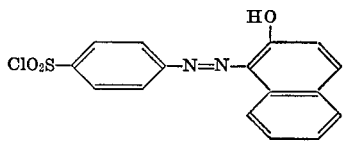

were allowed to stand overnight at room temperature in 100 ml. of pyridine. The reaction mixture was then heated on the steam bath for 30 minutes, allowed to cool and poured into 500 ml. of 10% NCl and 50 g. of ice. The resulting solid was filtered and recrystallized from ethyl acetate-methanol to yield 3.6 g. of an orange solid, M.P. 191–193° C. of the formula:

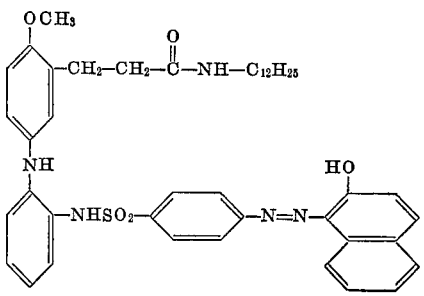

2.6 g. (0.0034 mole) of this solid in 50 ml. of methylene chloride was reacted with a large excess of boron tribromide in methylene chloride and the reaction mixture was allowed to stand at room temperature overnight. Water was cautiously added and when the reaction was complete, the mixture was stirred for one hour while bubbling nitrogen through the solution. The resulting orange solid was collected by filtration and crystallized from methanol to yield 2.6 g. of the compound, M.P. 150–151° C. of Formula 11.

EXAMPLE 2

The procedure of Example 1 was repeated, substituting n-$C_{18}H_{37}NH_2$ for the dodecylamine to obtain the compound of Formula 12.

EXAMPLE 3

15 g. of sodium carbonate was dissolved in 500 ml. of water. 57.3 g. of sulfanilic acid monohydrate was then slowly added. After all of this acid was dissolved, the resulting solution was cooled to 0° C. and 22.5 g. of sodium nitrite was added. After the sodium nitrite had dissolved, the resulting solution was poured into a mixture of 60.0 ml. of 37% HCl and 300 g. of ice to form a diazonium salt of the formula:

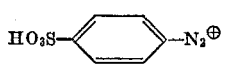

After formation of this diazonium salt, the reaction mixture was poured into a water-acetone solution of 15.9 g. of sodium carbonate and 69.6 g. of:

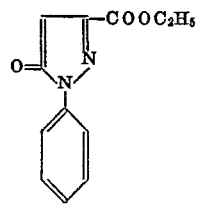

1-phenyl-3-carbethoxy-pyrazolone-5

The resulting mixture was allowed to stand for several hours, and then filtered to yield 125 g. of:

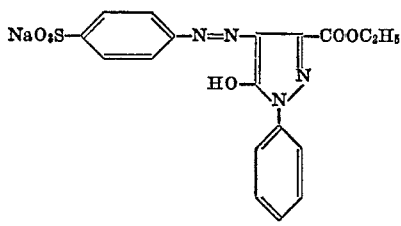

To a stirred slurry of 20 g. of this last-named compound in 50 ml. of water, was added 20.0 ml. of n-propylamine. The resulting mixture was refluxed with stirring overnight. Excess propylamine was boiled off and the remaining mixture was poured into 20% NCl. After filtration and recrystallization, 15.5 g. of the corresponding amide was obtained, M.P. 272–274° C. of the formula:

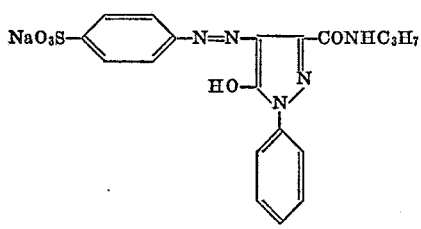

10.4 g. of this amide, 50.0 ml. of chlorobenzene, 5.0 ml. of thionyl chloride and 4.0 ml. of N,N-dimethylformamide were heated on a steam bath for one hour. The solvent was then removed by evaporation with a stream of nitrogen and the resulting mixture was triturated with hexanebenzene. Filtration and recrystallization from benzene yielded 4 g. of a compound, M.P. 185–187° C. of the formula:

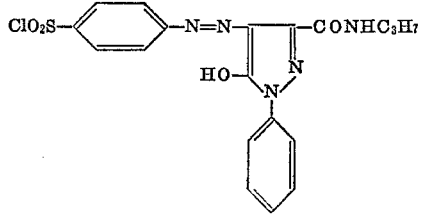

3.4 g. of this compound and 3.4 g. of an amine of the formula:

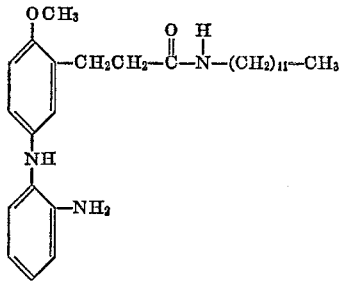

(prepared in the manner described in Example 2) were refluxed overnight in 50 ml. of dry benzene. The mixture was then cooled and the resulting solid collected and crystallized from benzene to yield 4 g. of a compound, M.P. 133–135° C. of the formula:

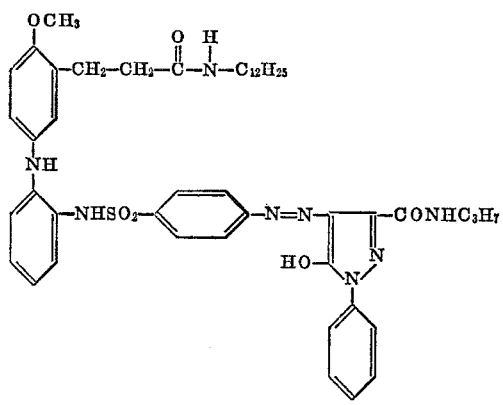

4.0 g. of this last-named compound in 50 ml. of dichloromethane was reacted with a large excess of boron tribromide and the reaction mixture was then allowed to stand overnight at room temperature. Water was added to "destroy" excess boron tribromide and the mixture was then stirred under nitrogen for one hour and filtered. The resulting solid residue was stirred in hot water and filtered. Recrystallization from benzene-hexane yielded 2.0 g. of the compound of Formula 13, yellow crystals, M.P. 138–140° C.

EXAMPLE 4

Fifteen grams of 4-fluoro-5-nitro-aniline, 35.0 grams of stearoyl chloride and 8.4 g. of sodium bicarbonate were stirred overnight at room temperature. The reaction mixture was then refluxed and the insoluble inorganic salts were filtered off. Upon cooling of the filtrate, an off-white solid was obtained, M.P. 82–83° C., having the formula:

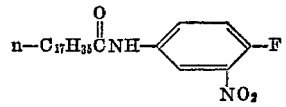

Thirty grams of 3-carboxy-4-methoxy-aniline was added to 75.0 g. of the 5-stearamido-2-fluoro-nitrobenzene (prepared above) and 45.0 g. of potassium acetate in 225 ml.

of dimethyl sulfoxide. The resulting mixture was stirred over a weekend under a flow of nitrogen while maintaining the temperature at about 100° C. It was then poured into a large amount of cold water and the resulting precipitate was filtered, washed with water and a small amount of ethanol. This crude product was then recrystallized from acetic acid to yield 36 g. of a yellow solid, M. P. 186–187° C., of the formula:

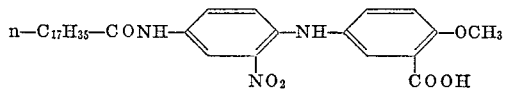

Four grams of the last-mentioned compound was hydrogenated in ethanol with a Pd/BaSO$_7$ catalyst to reduce the nitro group to an amino substituent. Following hydrogenation for about two hours, the product was filtered and quickly cooled to obtain 3 g. of the amine, a nearly white solid, M.P. 115° C. Seven g. of this amine was added to 4.7 g. of 4′-(sulfonyl-chloride)-phenylazo-2-naphthol in 100 ml. of pyridine under nitrogen. The mixture was allowed to stand overnight at room temperature. It was then heated on a steam cone for 30 minutes, then poured into 600 ml. of 10% HCl, filtered and then rinsed with water and a small amount of methanol. The resulting solid was next triturated with warm methylene chloride and filtered to yield 4.6 g. of a yellow solid, M.P. 138–140° C., of the formula:

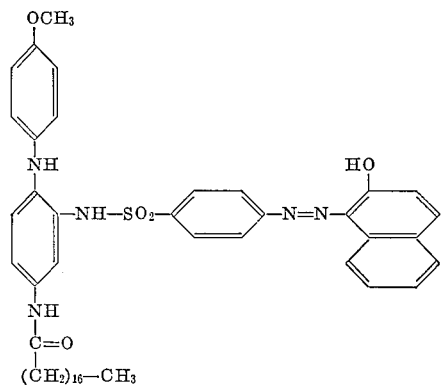

5.0 g. of the last-named compound was added to an unmeasured amount (about 60 ml.) of methylene chloride and 15 ml. of boron tribromide. The mixture was stirred overnight. The starting material went into solution as it complexed with the boron tribromide. The complex was decomposed with water, then triturated with hot water, methanol and hexane to yield 4.6 g. of the compound of Formula 9, a yellow solid, M.P. 260° C.

EXAMPLE 5

On a gelatin subcoated cellulose triacetate base sheet was coated, at a speed of 10 feet per minute a mixture containing 1.5 g. of the compound of Formula 11 and 10.0 cc. of an acetone solution containing 2% cellulose acetate hydrogen phthalate. After this coating dried, a second layer was coated thereover, at the same speed, containing 4.0 cc. of pan sensitive silver iodobromide emulsion, 1.0 cc. of 1% "Aerosol O.T." (trademark of American Cyanamid Co. for a wetting agent, dioctyl sodium sulfosuccinate), and 24.0 cc. of water. The resulting photosensitive element was exposed for .05 second and then developed by spreading between the thus exposed element and a superposed standard image-receiving element containing a dyeable stratum, at a gap of .0024″, a processing composition containing the following proportion of ingredients:

| | |
|---|---|
| Water _____cc__ | 100.0 |
| Hydroxyethyl cellulose _____g__ | 3.9 |
| Sodium hydroxide _____g__ | 5.0 |
| Triptycene diol _____g__ | 1.0 |

After an imbibition period of about two minutes, the photosensitive element was separated from the image-receiving element to reveal an orange negative transfer image.

EXAMPLE 6

The procedure described in Example 5 was repeated, except that the first coating contained 3.5 cc. of a silver-precipitating agent consisting of .08 g. of silver per 100 cc. of water. A similar negative transfer image was obtained.

EXAMPLE 7

The procedure of Example 6 was repeated, except that 1.0 g. of sodium thiosulfate was present in the processing composition. The $D_{max}$ and $D_{min}$ of the resulting transfer image were substantially identical, the substantially uniform transfer indicating that the presence of both a silver halide precipitating agent (Example 6) and a silver halide solvent resulted in the reaction mechanism for forming positive images described in the aforementioned application Ser. No. 655,440 in addition to the redox reaction, so that substantially equal densities of dye transferred from both exposed and unexposed areas.

Examples 6–7 indicate that while a negative image may be obtained by the redox reaction when one of the nucleating agent and silver halide solvent necessary for positive image formation are present, if both are present a usable negative transfer image may not be obtained.

EXAMPLE 8

On a gelatin subcoated cellulose acetate base sheet was applied a layer containing 136 mgm. per square foot of gelatin and 136 mgm. per square foot of the compound of Formula 11. Over this layer was applied a spacer layer comprising 50 mgm. per square foot of gelatin. Finally, a photosensitive layer was applied containing 100 mgm. per square foot of a blue-sensitive silver iodobromide emulsion. The resulting photosensitive element was exposed for .01 second and then developed by spreading between the thus exposed element and a superposed image-receiving element from a Polaroid Type 108 Land film, at a gap of .0016 inch, a processing composition containing the following proportions of ingredients:

| | |
|---|---|
| Water _____cc__ | 100.0 |
| Hydroxyethyl cellulose _____g__ | 3.9 |
| Sodium hydroxide _____g__ | 5.0 |
| Metol _____g__ | 1.6 |
| Propyl thio uracil _____g__ | 0.1 |
| Ethyl pyridinium bromide _____g__ | 5.0 |

After an imbibition period of 30 seconds, the respective elements were separated to reveal a dense negative transfer image.

In the above photographic examples, the color-providing material was contained initially in the photosensitive element, i.e., a photosensitive element such as is shown in the illustrative drawing. In the following example, the color-providing material is contained in the processing composition.

EXAMPLE 9

A photosensitive element from a Polaroid Type 47 Land film, comprising essentially a highspeed gelatino silver halide emulsion on a support layer, was exposed for .01 second and then developed by spreading between the thus exposed element and a superposed image-receiving element from a Polaroid Type 108 Land film, at a gap of .0026 inch, a processing composition containing the following proportions of ingredients:

| | |
|---|---|
| Water _____cc__ | 100.0 |
| Hydroxyethyl cellulose _____g__ | 3.9 |
| Sodium hydroxide _____g__ | 5.0 |
| Triptycene diol _____g__ | 1.0 |
| Compound of Formula 11 _____g__ | 1.0 |

After an imbibition period of about 60 seconds, the respective elements were separated to reveal an orange negative transfer image.

In the following example the color-providing material was again contained in the photosensitive element, only in this instance it was the only silver halide developing agent employed.

EXAMPLE 10

A photosensitive element was prepared containing on a cellulose triacetate base sheet a first layer containing 136 mgm. per square foot of gelatin and 136 mgm. per square foot of the compound of Formula 12; and a second layer containing 51 mgm. per square foot of a blue-sensitive silver iodobromide emulsion. This photo-sensitive element was exposed for .01 second and then developed by spreading between the thus exposed element and a superposed image-receiving element from a Polaroid Type 108 Land film, at a gap of .0026 inch, a processing composition containing the following proportions of ingredients:

| | |
|---|---|
| Water _____cc__ | 100.0 |
| Hydroxyethyl cellulose _____g__ | 3.9 |
| Sodium hydroxide _____g__ | 5.0 |

After an imbibition time of two minutes, the respective elements were separated to reveal a negative transfer image.

The novel procedures of this invention may be employed in various diffusion transfer systems utilizing exposure to penetrating ionizing radiation to provide a color image. For example, it is contemplated that the present invention may be employed to provide negative color radiographs of excellent detail and contrast affording the roentgenologist or other practitioner the desired information.

In the preparation of X-rays according to this invention, the photosensitive element is selectively exposed to X-radiation, e.g., by positioning the subject between the source of X-radiation and the photosensitive element. As in prior procedures of this nature, an X-ray intensifier screen is preferably employed to lower the amount of exposure or dosage necessary to provide a developable image of the desired density. The intensifier screen fluoresces or emits visible light when excited by X-radiation or other penetrating ionizing radiation and this emitted visible light serves further to expose or to intensify the exposure of the light-sensitive emulsion layer. The intensifier screen, which is preferably positioned in close optical proximity to the photosensitive element and may, for example, be a part thereof, may be any of the screens heretofore known in the art and employed for such purposes. It may, for example, comprise a barium sulfate/lead sulfate.

A radiograph prepared in this manner may be a monochrome or it is contemplated that two or more light-sensitive emulsion layers may be provided in the photosensitive element, each with an associated layer of color-providing material, to prepare multicolor negative radiographs. Where the color-providing moiety is a black dye, black-and-white radiographs may also be employed. Accordingly, as used throughout the specification and claims in connection with the various embodiments of this invention, the term "color" is intended to include both black dyes and the use of a plurality of colors to obtain black.

Either color reflection prints or transparencies may be obtained, depending upon the nature of the image-receiving element. It will be apparent that if the dyeable stratum is contained on a transparent support, the resulting transfer image may be viewed by transmitted light as a transparency; whereas if the support is opaque or contains a layer of an opaque material, the resulting transfer image may be viewable as a reflection print. It is also contemplated that the photosensitive element may contain a translucent layer of a material providing the requisite background, e.g., a white pigment such as titanium dioxide, so that the transfer image may be viewable either as a transparency or as a reflection print. The preparation of color transfer images viewable either by reflected or by transmitted light is described, for example, in the application of Howard G. Rogers, Ser. No. 293,449 filed July 8, 1963, now Patent No. 3,316,090.

From the foregoing description and illustrative examples, it will be seen that the present invention provides a simple and efficient system for obtaining negative color transfer images in a single development step. While applicable to the broad general field of photography, it may be particularly useful in the field of radiography where it is desired to obtain the necessary information in as short a processing time as possible and utilizing the minimal amount of processing equipment, e.g., in operating rooms, field hospitals, etc.

Since certain changes may be made in the above process without departing from the scope of the invention herein involved, it is intended that all matter contained in the above description or shown in the accompanying drawing shall be interpreted as illustrative and not in a limiting sense.

What is claimed is:

1. A process for forming color transfer images comprising the steps of providing a photosensitive element comprising at least one light-sensitive silver halide emulsion having associated therewith a layer of a non-diffusible material containing a diffusible color-providing moiety, which material is capable of forming by a redox reaction an oxidation product which can auto-react intramolecularly to effect ring-closure and to eliminate the diffusible color-providing moiety of said material for transfer; exposing said photosensitive element to provide a developable image; developing said image and, as a function of said development, selectively oxidizing said material in terms of exposed areas of said photosensitive element by a redox mechanism, thus providing an imagewise distribution of the oxidized material which contains the diffusible color-providing moiety, said oxidized material thereby auto-reacting intramolecularly to effect ring-closure and to eliminate said diffusible color-providing moiety in imagewise distribution; and transferring this imagewise distribution of eliminated diffusible color-providing moiety, at least in part, by imbibition, to a superposed stratum to impart thereto a negative color transfer image.

2. A process of preparing color transfer images comprising the steps of contacting an exposed photosensitive element comprising at least one light-sensitive silver halide emulsion containing a developable image with a developing composition including a silver halide developing agent to develop said image; as a function of said development forming an imagewise distribution of oxidized developing agent; contacting with at least a portion of said imagewise distribution of oxidized developing agent a non-diffusible material containing a diffusible color-providing moiety, said material being capable of forming by a redox reaction with oxidized silver halide developing agent an oxidation product which in turn auto-reacts intramolecularly to effect a ring-closure and to eliminate the diffusible color-providing moiety of said material for transfer; developing said image with said developing composition and, as a function thereof, oxidizing said material in terms of exposed areas of said photosensitive element by a redox reaction with oxidized developing agent, thus providing an imagewise distribution of the oxidized material containing the diffusible color-providing moiety, said oxidized material thereby auto-reacting to effect a ring-closure and to eliminate said diffusible color-providing moiety in imagewise distribution; and transferring this imagewise distribution of eliminated diffusible color-providing moiety, at least in part, by imbibition, to a superposed stratum to impart thereto a color transfer image.

3. A process as defined in claim 2 wherein said non-diffusible color-providing material is contained in a layer in said photosensitive element associated with said emulsion.

4. A process as defined in claim 2 wherein said non-diffusible color-providing material is contained initially in said processing composition.

5. A process as defined in claim 2 wherein said non-diffusible color-providing material is a compound of the general formula:

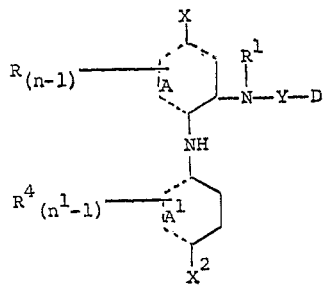

wherein:
each of A and $A^1$ represents the atoms necessary to complete an aromatic ring;
D is a color-providing moiety;
Y is a substituent which completes an amide with and reduces the basic character of the 3-amino substituent bonded thereto, said Y substituent further being a divalent radical linking said D moiety to said 3-nitrogen atom;
X and $X^2$ each is hydrogen, hydroxy, amino or the substituent R, provided that at least one of X and $X^2$ must be hydroxy or amino;
R and $R^4$ each represents an anchoring moiety rendering said compound non-diffusible;
$R^1$ is hydrogen, alkyl or substituted alkyl; and
n and $n^1$ each is 1 or 2, provided that when $R^1$ is an alkyl radical or X or $X^2$ is a secondary or tertiary amino comprising an anchoring moiety rendering said compound non-diffusible or when $R^1$, X and $X^2$ together contribute an anchoring moiety, n and $n^1$ may be 1, but when said substituents alone or together do not contribute an anchoring moiety at least one of n and $n^1$ must be 2.

6. A process as defined in claim 2 wherein said non-diffusible color-providing material is a compound of the general formula:

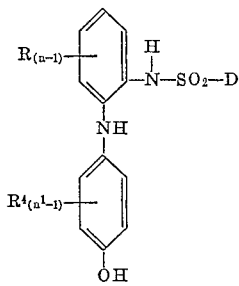

wherein:
each of R and $R^4$ comprises an amide of at least 13 carbon atoms, said amide being bonded directly to a nuclear carbon atom of the shown benzene moiety or linked thereto through a phenylene or alkylene substituent;
each of n and $n^1$ is 1 or 2, provided that at least one of said n and $n^1$ is 2; and
D is a monoazo, disazo or anthraquinone dye moiety.

7. A process as defined in claim 2 wherein said non-diffusible color-providing material is a compound selected from those designated in the specification as Formulae 1 through 23.

8. A process for preparing negative color transfer images comprising the steps of contacting with a developing composition including a silver halide developing agent an exposed photosensitive element comprising at least one light-sensitive silver halide emulsion containing a developable image and having associated therewith a layer of a non-diffusible compound containing a diffusible dye moiety and an anchoring moiety rendering said compound non-diffusible, said compound being oxidizable by a redox reaction to provide an oxidation product which can auto-react intramolecularly to effect ring-closure and to eliminate said dye moiety as a separate diffusible compound; developing said image and, as a function of said development, forming an imagewise distribution of oxidized developing agent in terms of exposed and developed areas of said emulsion; contacting said compound with at least a portion of said imagewise distribution of oxidized developing agent; oxidizing said non-diffusible compound by a redox reaction with said oxidized developing agent whereby said developing agent is reduced and said compound is in turn oxidized, said oxidized compound then auto-reacting intramolecularly to eliminate said diffusible dye moiety to provide an imagewise distribution of diffusible dye as a function of said reaction; and transferring said imagewise distribution of diffusible dye, at least in part, by imbibition, to a superposed strata to impart thereto a negative color transfer image.

9. A process for preparing negative color transfer images comprising the steps of exposing a photosensitive element comprising at least one light-sensitive silver halide emulsion having associated therewith a substantially immobile compound having a silver halide developing moiety, a diffusible color-providing moiety and an anchoring moiety rendering said compound only slightly mobile in an aqueous alkaline medium, said compound upon oxidation providing an oxidation product which can auto-react intramolecularly to effect ring-closure and to eliminate said diffusible color-providing moiety for transfer;
contacting said exposed element with an aqueous alkaline fluid to bring said compound into contact with said exposed silver halide;
developing exposed areas of said emulsion with said compound, said compound becoming oxidized as a function of said development to provide an imagewise distribution of said oxidized compound in terms of developed areas of said emulsion, said oxidized compound thereby auto-reacting to effect a ring-closure and to eliminate said diffusible color-providing moiety in imagewise distribution; and
transferring this imagewise distribution of eliminated diffusible color-providing moiety, at least in part, by imbibition, to a superposed stratum to impart thereto a negative color transfer image.

10. A process as defined in claim 2 wherein said photosensitive element is exposed to penetrating ionizing radiation to provide said developable image.

11. A process as defined in claim 10 wherein an X-ray intensifier screen is employed during said exposure, said exposure being effected by the combination of said penetrating ionizing radiation and the visible light emitted by said screen upon excitation by said radiation.

12. A process for preparing negative radiographs comprising the steps of selectively exposing to X-radiation through an X-ray intensifier screen a photosensitive element comprising a light-sensitive silver halide emulsion having associated therewith a layer of a non-diffusible compound containing a diffusible color-providing moiety and an anchoring moiety rendering said compound non-diffusible, said compound being oxidizable by a redox reaction with oxidized silver halide developing agent to provide an oxidation product which can auto-react intramolecularly to effect ring-closure and to eliminate said color-providing moiety as a separate diffusible compound;
contacting said exposed element with an aqueous alkaline processing composition including a silver halide developing agent to develop said emulsion and, as a function of said development, forming an imagewise distribution of oxidized developing agent in terms of exposed and developed areas of said emulsion;

contacting said compound with at least a portion of said imagewise distribution of oxidized developing agent;

oxidizing said non-diffusible compound by a redox reaction with said oxidized developing agent, whereby said oxidized developing agent is reduced and said compound is in turn oxidized, said oxidized compound then auto-reacting intramolecularly to eliminate said diffusible dye moiety to provide an imagewise distribution of diffusible dye as a function of said reaction; and transferring said imagewise distribution of diffusible dye, at least in part, by imbibition, to a superposed stratum to form thereon a negative color radiograph.

13. A process as defined in claim 12 wherein said compound is of the formula:

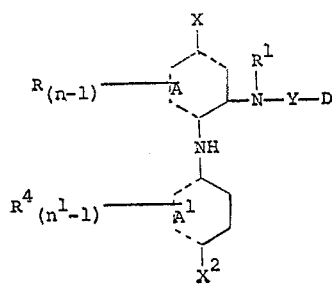

wherein:
each of A and $A^1$ represents the atoms necessary to complete an aromatic ring;

D is a color-providing moiety;

Y is a substituent which completes an amide with and reduces the basic character of the 3-amino substituent bonded thereto, said Y substituent further being a divalent radical linking said D moiety to said 3-nitrogen atom;

X and $X^2$ each is hydrogen, hydroxy, amino or the substituent R, provided that at least one of X and $X^2$ must be hydroxy or amino;

R and $R^4$ each represents an anchoring moiety rendering said compound non-diffusible;

$R^1$ is hydrogen, alkyl or substituted alkyl; and $n$ and $n^1$ each is 1 or 2, provided that when $R^1$ is an alkyl radical or X or $X^2$ is a secondary or tertiary amino comprising an anchoring moiety rendering said compound non-diffusible or when $R^1$, X and $X^2$ together contribute an anchoring moiety, $n$ and $n^1$ may be 1, but when said substituents alone or together do not contribute an anchoring moiety at least one of $n$ and $n^1$ must be 2.

References Cited

UNITED STATES PATENTS 3,347,673  10/1967  Downey _____ 96—29

NORMAN G. TORCHIN, *Primary Examiner.*

ALFONSO T. SUROPICO, *Assistant Examiner.*

U.S. Cl. X.R.

96—29